United States Patent
Volz et al.

[11] Patent Number: 6,143,440
[45] Date of Patent: Nov. 7, 2000

[54] PROTECTIVE DEVICE FOR A REPEATEDLY RECHARGEABLE ELECTROCHEMICAL BATTERY

[75] Inventors: Andreas Volz; Joachim Baumann; Klaus Bodganowitz, all of Mü unchen; Hans Leysieffer, Taufkirchen; Dieter Müller, Meitingen; Gerd Müller, Lohhof, all of Germany

[73] Assignee: Implex Aktiengesellschaft Hearing Technology, Ismaning, Germany

[21] Appl. No.: 09/359,120

[22] Filed: Jul. 23, 1999

[30] Foreign Application Priority Data

Aug. 20, 1998 [DE] Germany ............... 198 37 909

[51] Int. Cl.[7] .............................................. H01M 10/48
[52] U.S. Cl. ..................... 429/92; 429/61; 429/7; 429/121; 429/100
[58] Field of Search ............... 429/92, 90, 61, 429/7, 121, 65, 96, 100, 97

[56] References Cited

U.S. PATENT DOCUMENTS

| | | |
|---|---|---|
| 2,651,669 | 9/1953 | Neumann . |
| 3,933,526 | 1/1976 | Rackin . |
| 3,957,056 | 5/1976 | Comben et al. . |
| 4,275,739 | 6/1981 | Fischell . |
| 5,279,292 | 1/1994 | Baumann et al. ............... 607/137 |
| 5,369,802 | 11/1994 | Murray ............................ 455/351 |
| 5,371,456 | 12/1994 | Brainard ........................... 320/31 |
| 5,783,322 | 7/1998 | Nagai et al. ........................ 429/7 |
| 5,962,157 | 10/1999 | Kang ................................. 429/62 |
| 5,976,720 | 11/1999 | St. Jean et al. .................... 429/7 |

FOREIGN PATENT DOCUMENTS

| | | |
|---|---|---|
| 0 322 112 | 6/1989 | European Pat. Off. . |
| 0 360 395 | 3/1990 | European Pat. Off. . |
| 0 364 995 | 4/1990 | European Pat. Off. . |
| 0 370 634 | 5/1990 | European Pat. Off. . |
| 0 470 729 | 2/1992 | European Pat. Off. . |
| 0 674 351 | 9/1995 | European Pat. Off. . |
| 0 739 047 | 10/1996 | European Pat. Off. . |
| 0 573 998 | 12/1996 | European Pat. Off. . |
| 27 19 301 | 11/1977 | Germany . |
| 37 42 088 | 6/1989 | Germany . |
| 41 27 526 | 2/1993 | Germany . |
| 56-19872 | 2/1981 | Japan . |
| 7-335274 | 12/1995 | Japan . |
| WO 94/10712 | 5/1994 | WIPO . |

OTHER PUBLICATIONS

Patent Abstracts of Japan, vol. 007, No. 115 (E–176)M May 19, 1983, & JP 034577 A (Tokyo Shibaura Denki KK), Mar. 1, 1983, English Abstract.

*Primary Examiner*—Maria Nuzzolillo
*Assistant Examiner*—R Alejandro
*Attorney, Agent, or Firm*—Nixon Peabody LLP; David S. Safran

[57] ABSTRACT

A protective device for a repeatedly rechargeable electrochemical battery (10) with a battery housing (12), the protective device having at least one switching element (86) which can be activated by a detector element (62) and which is designed or adjusted to prevent recharging and/or discharging of the battery (10) in an impermissible operating state thereof. The protective device has a hermetically sealed protective housing (54) which holds the battery housing (12). An impermissible operating state of the battery (10) causes a change in shape (deflection) to be impressed on the detector element (62). Preferably, the at least one switching element (86) is made as a make contact which electrically short circuits a recharging circuit supplied by a charging device when a predetermined expansion in the volume of the battery housing (12) and/or gas escape therefrom occurs. The protective device is part of an implantable device, such as a hearing aid.

31 Claims, 10 Drawing Sheets

PROTECTIVE DEVICE FOR A REPEATEDLY RECHARGEABLE ELECTROCHEMICAL BATTERY

BACKGROUND OF THE INVNTION

1. Field of the Invention

The invention relates to a protective device for a repeatedly rechargeable electrochemical battery with a battery housing, the protective device having at least one switching element which can be activated by a detector element and which is designed or adjusted to prevent recharging and/or discharging of the battery in an unallowable operating state thereof.

2. Description of Related Art

In electrochemical batteries, for example, due to excess charging or a short circuit between the terminal contacts of the battery housing, the pressure can rise within the battery, which can lead to a deformation of the battery housing which is so great that chemicals emerge especially in gaseous form.

It is known from published European Patent Application Nos. EP A 0 322 112, EP A 0 360 395 and EP A 0 370 634 that electrochemical batteries can be provided with a switching element which, when a certain still tolerated boundary deformation of the battery housing is exceeded, preferably, irreversibly separates an electrical terminal contact from the pertinent electrochemically active electrode in order to prevent further deformation of the battery housing. The battery housing comprises an electrically conductive cylindrical housing section which is closed on the face and which makes contact with an electrode, the face the plate-shaped switching element being attached centrally from the outside by means of electrically insulating cement. In its base position, the electrically conductive outside edge of the switching element forms an electrical connection between the housing section and the electrical terminal contact which projects to the outside and which is located in the center of the switching element. When the pressure increases within the battery housing, the face of the housing section which acts as the detector element curves to the outside, interrupting the contact between the housing section and the outside edge of the switching element, and thus, between the one electrode and the terminal contact. Typical applications of these switching elements are type "D" standard batteries. The curving of the face side, starting from which the switching element interrupts the electrical contact, in this case, is 0.76 mm to 1.8 mm. For curvatures exceeding 1.8 mm, escape of chemicals from the interior of the battery housing can usually be expected.

Published European Patent Application No. EP A 0 470 726 discloses an electrochemical battery with a cylindrical battery housing and a pressure membrane as a detector element which is integrated on the face side in the battery housing and which deflects when the pressure rises in the interior of the battery housing, by which a plate-shaped switching element centrally connected to the pressure membrane reversibly or irreversibly interrupts the electrical contact between an electrode and a terminal contact of the battery.

Published European Patent Application No. EP A 0 674 351 discloses an electrochemical battery with a battery housing which comprises a cutting device which can be actuated by a pressure membrane and which irreversibly cuts an electrical lead when a pressure limit within the battery housing is exceeded and which connects a terminal contact of the battery with an electrochemically active electrode.

Also, when using a switching element which interrupts the electrical connection between the terminal contact and the respective electrochemically active electrode, when a certain pressure is exceeded within the battery housing, it is possible for the pressure to continue to rise and ultimately for the chemicals to escape from the battery housing or for it even to explode. For this reason, it was proposed (for example, in Published European Patent Application Nos. EP A 0 364 995, EP A 0 573 998 or EP A 0 739 047) that a pressure membrane which actuates the switching element and which is integrated into the battery housing be provided with a bursting area via which chemicals can escape from within the battery housing after activation of the switching element and after the pressure continues to rise.

The protective devices listed in the aforementioned prior art for electrochemical batteries are not suitable for use as part of implantable devices because, for this purpose, especially high demands must be satisfied, particularly with respect to safety and reliability together with simultaneous reduction of all dimensions as much as possible. Contamination of the surrounding tissue with toxic substances and endangerment of the implant wearer by battery malfunction must be precluded under all operating conditions.

SUMMARY OF THE INVNTION

Thus, a primary object of the present invention is to devise a protective device for a repeatedly rechargeable electrochemical battery which satisfies the specific requirements for implantable devices.

This object is achieved, in a protective device for a repeatedly rechargeable electrochemical battery with a battery housing that has at least one switching element which can be activated by a detector element and which prevents recharging and/or discharging of the battery in an unallowable operating state thereof, by the protective device having a hermetically sealed protective housing which holds the battery housing, impresses a change in shape on the detector element in an unallowable operating state of the battery, and is part of an implantable device.

Since the protective housing holds the battery housing hermetically tight, no special requirements are imposed on the battery housing itself. It is therefore possible to use a conventional battery, for example an ordinary button cell, without regard to material choice or the like. Chemicals emerging from the interior of the battery housing are securely retained in the hermetically sealed protective housing which can be made explosion-proof Here, hermetic sealing is defined preferably as per Mil-Std 883 D. This arrangement ensures that, when using a rechargeable battery or storage battery in an electronic implant, which itself is, in turn, housed in a hermetically sealed, bio-compatible housing, neither liquid toxic substances, nor gases can escape from the protective housing. These gases occur mainly in small amounts even during proper, normal storage battery operation. The hermetic sealing of the protective housing reliably prevents damage to the surrounding electronics; this means that the electronic circuits, especially integrated circuits, can remain unprotected, since contamination by even the smallest amounts of escaping battery gases is not possible.

Since a change in shape cannot be directly impressed on the detector element in an impermissible operating state of the battery by the battery housing, but is impressed by the hermetically sealed protective housing, it is fundamentally possible for continuous escape of chemicals from the battery housing to be detected as an impermissible operating state which leads to a pressure rise in the protective housing.

The functional separation of the battery and battery housing, on the one hand, and the protective housing and detector element with the change of shape impressed by the protective housing, on the other, allow independent selection and optimization of the respective components. For example, the requirements for dimensional tolerances of the battery housing need not be very great, since deviations can be measured and equalized on the protective housing when it is manufactured.

The implantable device can, among others, be an active, electronic hearing implant, a cardiac pacemaker, a drug dispenser, a neurostimulator or the like.

Recharging of the battery is preferably prevented by making at least one switching element as a break contact which is designed or adjustable to electrically interrupt a recharging circuit which can be supplied by a charging device in an impermissible operating state of the battery.

Furthermore, at least one switching element can be made as a break contact which is designed or adjustable to electrically interrupt the consumer circuit in an impermissible operating state of the battery. Thus, it is possible, for example, in a short circuit in the consumer circuit, to prevent overly high electrical power being withdrawn from the battery; this likewise can cause an impermissible operating state of the battery, i.e. for example expansion of the volume of the battery or gas escape from the battery housing which can lead to a pressure rise within the hermetically sealed protective housing. It is also possible for the break contact to be arranged such that it interrupts the recharging circuit simultaneously with the consumer circuit.

In another preferred embodiment of the invention, at least one switching element is made as a make contact which is designed or adjustable to electrically short circuit the recharging circuit which can be supplied by a charging device in an impermissible operating state of the battery, by which further power supply to the battery is interrupted.

Furthermore, there can also be an operating element which is made as a make contact which is designed or adjustable to electrically short circuit the battery when it is in an impermissible operating state. This make contact is an especially good idea in serial connection to an overcurrent fuse which can irreversibly interrupt a current in a recharging and/or consumer circuit of the battery. The overcurrent fuse can be made as a fusible link which is burned through when the residual energy stored in the battery is short circuited. If the power for this purpose is inadequate, the battery can be completely discharged. It is likewise possible for at least one overcurrent fuse to simply limit the current in the recharging and/or consumer circuit, advantageously the overcurrent fuse being made as a cold lead (PT resistor) with a resistance which rises as the temperature rises.

The switching elements can essentially reversibly or irreversibly interrupt a circuit into which they are incorporated. Reversibly operating switching elements offer the advantage that their operation can be checked nondestructively, for example, in the assembled state in interaction with other components of the protective device.

The change of shape impressed on the detector element by the protective housing in an impermissible operating state of the battery feasibeley actuates at least one switching element mechanically. Direct mechanical actuation of the switching element by the change in the shape of the detector element is especially reliable since it necessarily operates without being dependent on nonmechanical transmission members.

This does nor preclude that especially when two or more switching elements are present redundantly, at least one switching element can be actuated by evaluation electronics which acquire the change in shape of the detector element. An electrical extensometer which acquires the change in the shape of the detector element and which responds with a change of an electrical quantity which is monitored by the evaluation electronics is used to advantage. If the electrical extensometer is a passive system, it can convert the change in the shape of the detector element into a change of its electrical resistance (strain gauge), its inductance or its capacitance. Alternatively, an active electrical extensometer can be used which reacts, for example, like a piezoelement, with a change in charge related to the change in shape imposed on the strain gauge by the detector element.

In another embodiment of the invention, the detector element is a part of the protective housing and is made especially as a deflectable membrane which especially forms an outside wall or partition of the hermetically sealed protective housing. This allows a space-saving construction and an easily predictable change in shape of the detector element when the pressure rises in the protective housing.

In particular, the thickness of the protective housing, which is especially critical for an implantable device, can be minimized if at least a membrane is integrated into a side wall of the hermetically sealed protective housing, the direction of curvature of the membrane running especially perpendicular to the smallest dimension of the battery. A cover or bottom of the protective housing which is provided in the direction of the smallest dimension of the battery above and below the latter then remains essentially free of detector and switching elements so that the thickness of the protective housing only slightly exceeds that of the battery. A redundant safety against an impermissible operating state of the battery arises when, for example, there are two membranes, of which one is made as part of a make contact and a contact pair of the make contact can be electrically short circuited by means of this membrane due to occurrence of an impermissible operating state of the battery. The second membrane can be made as part of a break contact, and by means of this second membrane, in an impermissible operating state of the battery, a contact pair of the break contact can be electrically disengaged.

It is advantageous for the hermetically sealed configuration of the protective housing and a simple structure thereof, when the battery with two terminal contacts located on the battery housing makes contact with areas of the protective housing, if the contacts are electrically insulated relative to one another, the electrically conductive areas of the protective housing which they contact being electrically insulated relative to one another and being electrically connected to a recharging circuit and/or a consumer circuit.

The dimensions of the insulating regions, which are formed preferably by a ceramic and are provided in the protective housing, can be minimized if at least one terminal contact of the battery housing is electrically connected to a recharging and/or consumer circuit via a hermetically sealed feed-through which is electrically insulated with reference to the protective housing.

The feed-through can, in principle, be made with one or more poles, the number of poles advantageously corresponding to that of the terminal contacts or poles of the battery. However, by means of the feed-through, not only power transmission, but fundamentally also signal transmission by a wall of the protective housing is possible. The feed-through preferably comprises a ceramic substrate, for each penetrating pole a metallic contact pin penetrating the substrate in a hermetically sealed manner.

The contact pins can be held in the ceramic substrate in an outside wall of the protective housing hermetically sealed by means of a material connection, for example, a solder connection, especially a gold solder connection.

It can be advantageous for the contact pins to be held in the ceramic substrate and the substrate held in a metallic receiver that is hermetically sealed by means of a material connection, the metallic receiver being, likewise, connected to an outside wall of the protective housing. A weld or solder connection can also be used to connect the metallic receiver to the outside wall of the protective housing.

If the protective housing as a whole is made biocompatible, it can be implanted directly and connected to the user via permanently connected or detachable electric lines; its implantation site is thus irrelevant, as is described also in the German Patent Application No. 198 37 912.9 of Aug. 20, 1998 and in corresponding commonly assigned U.S. patent application Ser. No. 09/359,050 which is being filed at the same time as this application. Materials for the biocompatible protective housing can be, preferably, titanium niobium, tantalum, implantable steels or a composite thereof or of other implantable metals with ceramic materials, such as aluminum oxide ceramic, for which jacketing of the entire protective housing with a biocompatible polymer can be a good idea, such as, for example, silicone, polytetrafluoroethylene (PTFE), polymethane, parylene or the like.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
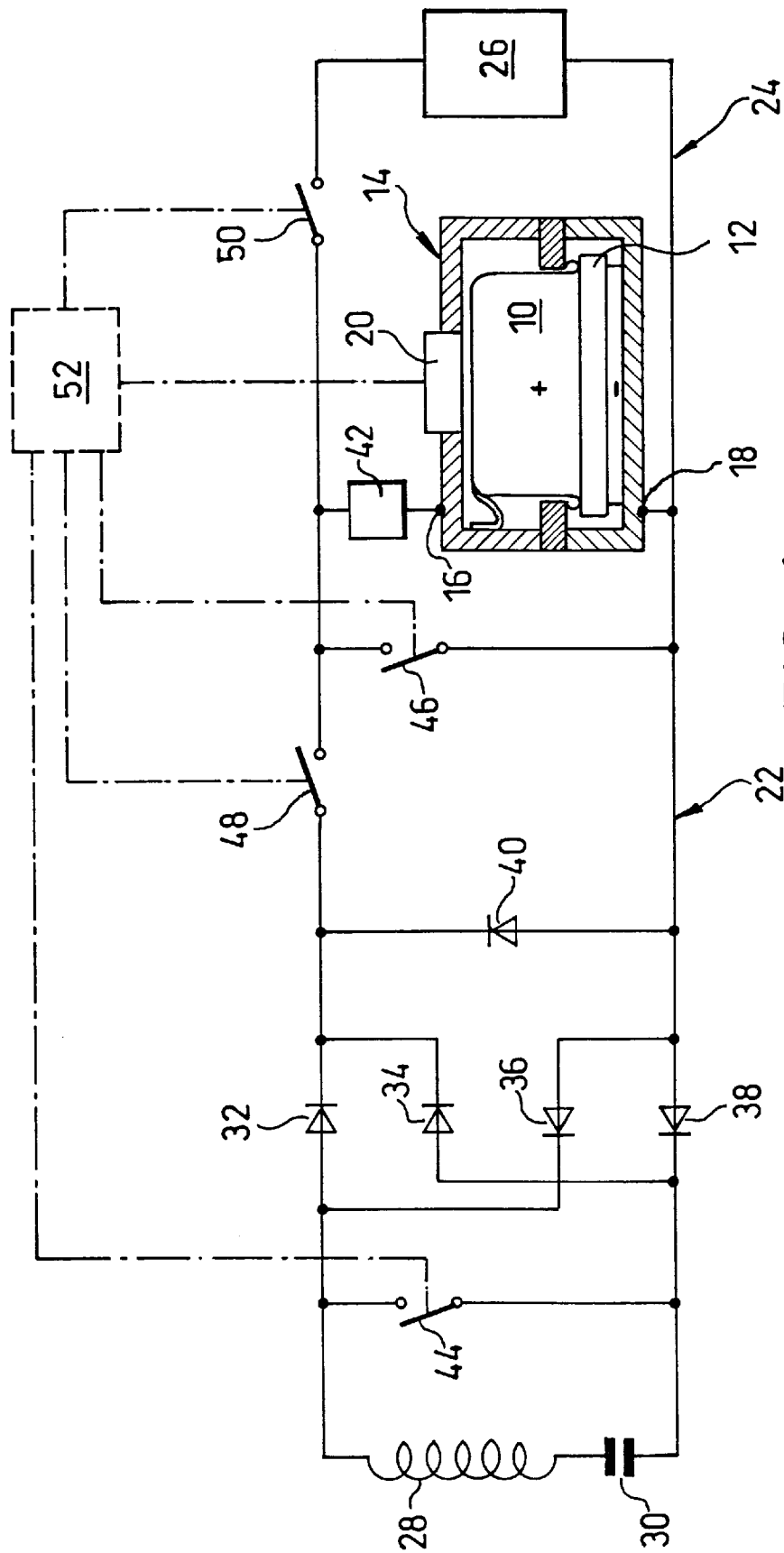
FIG. 1 is a schematic circuit diagram with a protective device incorporated into a consumer and a recharging circuit.

According to FIG. 1, a battery 10 with its battery housing 12 is held hermetically sealed in a protective housing 14 such that a positive and a negative terminal contact of the battery 10 (in the figures labelled + and −) are tapped via terminals 16 and 18 on the protective housing and are connected to a recharging circuit 22 and a consumer circuit 24. The protective housing 14 is made such that it impresses a change in shape on the detector element 20 in an impermissible operating state of the battery 10. In the consumer circuit 24, via a break contact 50, the battery supplies a consumer 26 which can be, for example, an implantable hearing aid. The recharging circuit 22 has a receiving coil 28 which together with a capacitor 30 forms a series resonant circuit which is excited by a second series resonant circuit of an external transmitting part with the same resonance range, the second circuit not being shown, can be as described in U.S. Pat. No. 5,279,292. The recharging circuit 22 closes depending on the phase via diodes 32, 38 and 34, 36, a break contact 48, an overcurrent use 42 and the battery 10 held in the protective housing 14. A Zener diode 40 protects the battery 10 against an overly high voltage of the recharging circuit. Parallel to the receiving coil 28 and the capacitor 30, there is a make contact 44. Another make contact 46 is located parallel to the battery 10 and the overcurrent fuse 42.

As illustrated by the dot-dash lines in FIG. 1, the detector element 20 actuates the switching elements 44, 46, 48, and 50 which are part of the protective device. This can take place either directly, for example, by mechanical coupling of the detector element and one or more switching elements, or via optional evaluation electronics 52 which acquire the change in the shape of the detector element and which actuate one or more switching elements electrically or electromechanically. It goes without saying that not all of the switching elements 44, 46, 48 and 50 need be present, and that the classification, which of the switching elements are actuated directly or via the optional evaluation electronics 52, can be varied depending on the application and desired redundancy of the protective device.

The position of the operating elements 44, 46, 48 and 50 shown in FIG. 1 corresponds to the base position in normal operation. In the case of an impermissible operating state of the battery 10, at least one of these switching elements is actuated.

Figure 2:
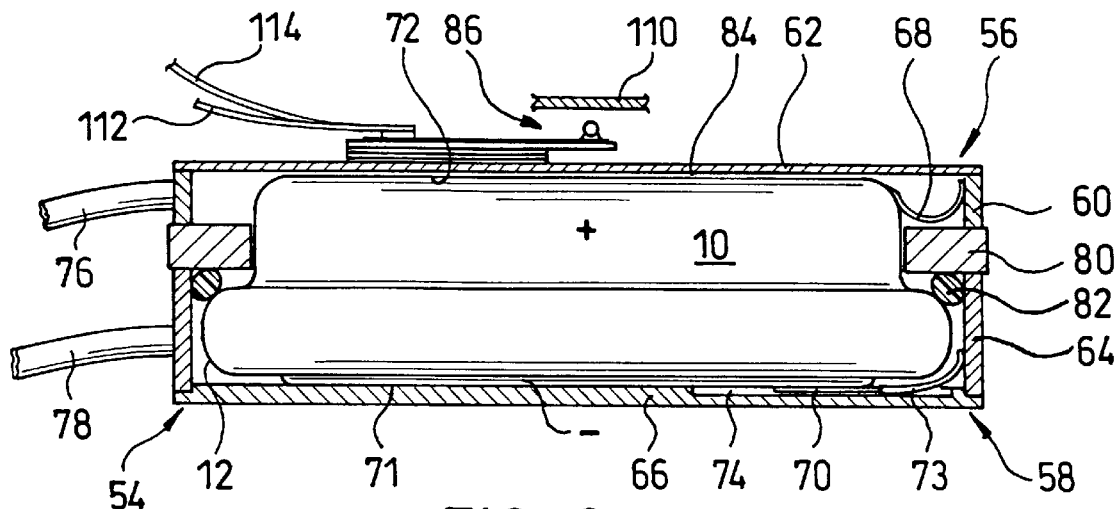
FIG. 2 is a schematic section through a first embodiment of a protective device with a reversibly operating switching element.
Figure 3:
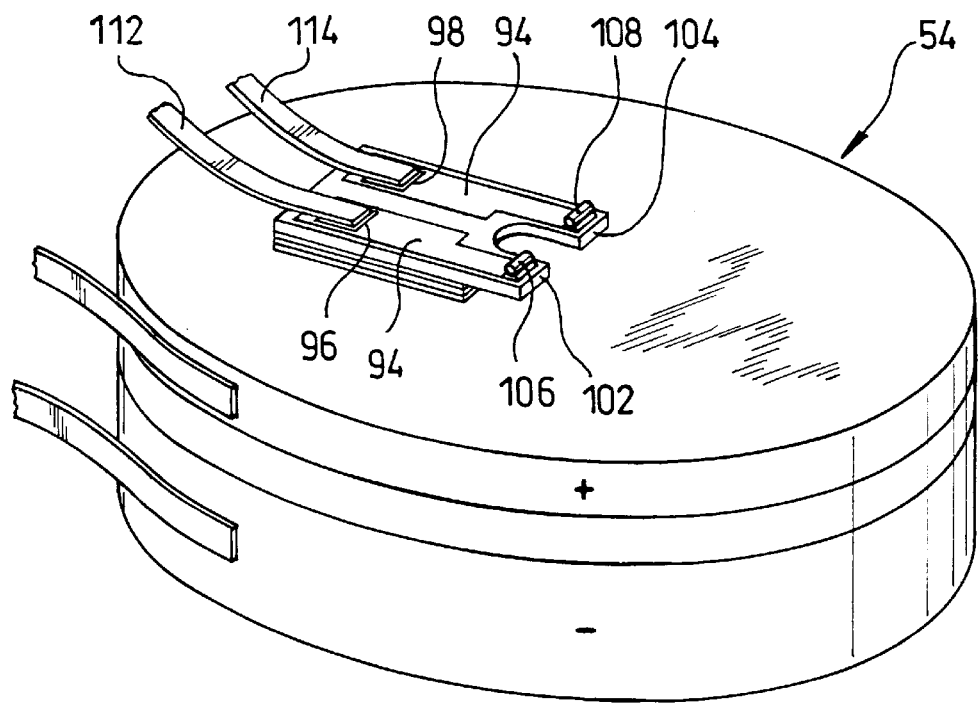
FIG. 3 is a schematic perspective view of the embodiment as shown in FIG. 2.
Figure 4:
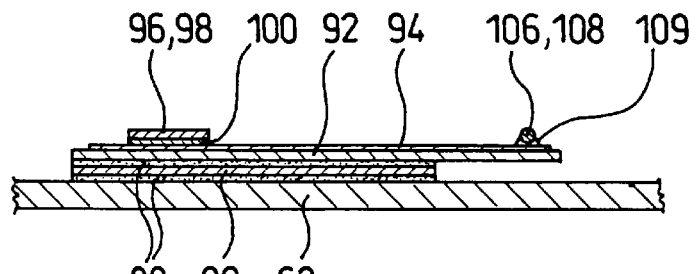
FIG. 4 shows a portion of the embodiment shown in FIG. 2 on a larger scale.

A first embodiment of a protective device is shown in FIGS. 2 to 4 and comprises a hermetically sealed protective housing 54 with a bowl-shaped cover 56 and a likewise bowl-shaped bottom 58. A hollow cylindrical side wall 60 of the cover 56 is welded to a cover plate 62 which forms the detector element of the protective device as the deflectable membrane. The bottom 58 is formed by a hollow cylindrical side wall 64 and a bottom plate 66 welded to it. The battery 10, which is a conventional rechargeable button cell, is held within the protective housing 54, the positive terminal contact of the battery housing 12 being tapped via a contact clip 68 which is in contact with the inside of the side wall 60. The negative terminal contact of the battery 10 is tapped from a face 71 of the battery housing 12 by means of a contact clip 70 and is routed from the inside to the side wall 64, a recess 74 in the edge area of the bottom plate 66 enabling the face 71 of the battery housing to rest over a large surface on the bottom plate 66 in spite of placement of the contact clip 70. An insulating tube or sleeve 73, pushed over the contact clip 70, prevents electrical contact between the contact clip 70 and the positive terminal contact of the battery 10. Both the cover 56 and also the bottom 58 are produced from an electrically conductive material that is resistant to chemicals leaking from the battery housing (for example, titanium) and have electrical terminals 76 and 78 which correspond to terminals 16 and 18 as shown in FIG. 1.

The side walls 60 and 64 are welded or soldered to one another via their surfaces which face towards one another with interposition of an insulating ring 80, that is made, for example, of an oxide ceramic, the insulating ring having a smaller inside diameter than the side walls 60 and 64, thereby hermetically sealing them. On the face of the insulating ring 80 which is located within the protective housing 54 and which faces the bottom plate 66, an O-ring 82 is supported which acts on one shoulder of battery housing 12 such that the face 71 of the battery housing 12 is slightly prestressed against the bottom plate 66 and abuts it without play.

On the cover plate 62, a switching element, labelled 86 as whole, is attached and corresponds to the make contact 44 of FIG. 1. As an important component, the make contact 86 has a flexible contact carrier 92, for example, of polyimide, with the shape of a roughly rectangular thin-walled plate having a short side with a U-shaped notch that creates two spring arms 102, 104. Along the two longer sides, on the top of the contact carrier 92, metal layers 94 are attached, and which extend onto the spring arms 102 or 104, a section of a platinum wire is soldered on each layer 94 as a contact 106 or 108, via the solder connection 109. In the vicinity of the second short side of the contact carrier 94, by means of a solder layer 100, a respective contact plate 96, 98 is connected to each of the two metal coatings 94. The contact plates 96, 98 each bear a respective terminal 112, 114 so that the terminal 112 is electrically connected to the contact 106 and the terminal 114 is electrically connected to the contact 108. At a short distance above the contacts 106 and 108, there is a contact bridge 110 with which contacts 106, 108 can be brought into engagement to electrically short circuit them. The flexible contact carrier 92 is connected, via a multilayer structure, with the cover plate 62 such that the contacts 106, 108 are located in the middle of the cover plate 62 and in an overhead view run along an axis of symmetry of the round cover plate 62.

As shown in FIG. 4, the multilayer structure between the contact carrier 92 and the cover plate 62, proceeding from the bottom of the contact carrier 92 facing the cover plate 62, comprises an adhesive layer 88, a spacer plate 90 and a second adhesive layer 88. The multilayer structure extends roughly from the short side of the contact carrier 92 which has the contact plates 96, 98 to the base of the U-shaped notch which separates the two spring arms 102, 104 so that they stand freely at an exactly established distance over the cover plate 62.

The contact clip 68 can be made as a fusible link which interrupts the electrical connection between the positive terminal contact of the battery housing 12 and the terminal 76 when the current flowing via it exceeds a boundary value. In this case, there must be insulation between one face 72 of the battery housing 12 which faces the cover plate 62 and the latter.

Between the bottom of the cover plate 62 and the face 72 of the battery housing 12, there is a gap 84 of given thickness which equalizes the allowable natural respiration of the battery housing 12 under different operating conditions. If the battery housing 12 continues to expand, the face 72 of the battery housing adjoins the cover plate 62 and impresses a curvature thereon, the remaining protective housing 54 which is designed to be stiffer than the cover plate 62 is deformed only little. Thus the increase in the volume of the battery housing 12 is converted in a controlled manner into a curvature of the cover plate 62 made as a membrane. The same applies when chemicals leak out of the battery housing 12 which lead to a pressure increase within the protective housing 54 without the thickness of the battery housing 12 necessarily increasing. The curvature of the cover plate 62 causes the contacts 106 and 108 and the contact bridge 110 to approach one another in order to finally, when the contacts reach one another, electrically short circuit the terminals 112 and 114, and via these terminals, the recharging circuit 22 so that further power supply to the battery is suppressed. The flexible configuration of the spring arms 102, 104 prevents damage to them when the switching element 86 closes so that the make contact 86 in principle operates reversibly. When the internal pressure decreases in the protective housing 54 or when the increase in the volume of the battery housing 12 falls back, the switching element 86 again assumes its base position shown in FIG. 2.

The curvature of the cover plate 62 which leads to actuation of the switching element 86 is generally less than 300 microns, the protective housing 54 for example having an outside diameter of roughly 18 mm at a height of less than 5.5 mm, measured from the bottom plate 66 to the cover plate 62.

Figure 5:
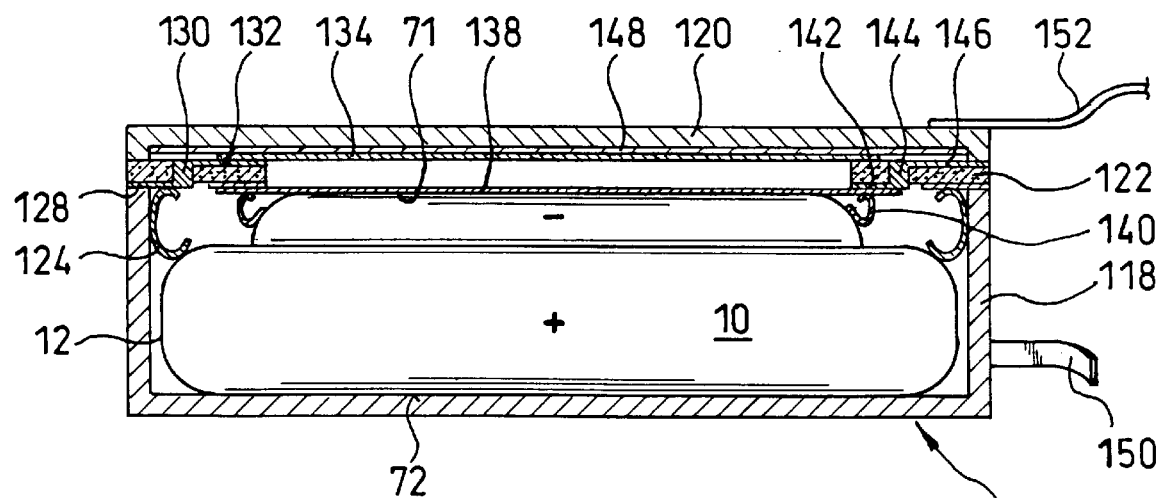
FIG. 5 is a schematic section through a second embodiment of a protective device.

FIG. 5 shows a second embodiment of a protective device which has a protective housing 116 with a bowl-shaped, one-part bottom 118 of electrically conductive material. The protective housing 116 is closed by a, likewise, electrically conductive cover 120. An insulating ring 122 of oxide ceramic is soldered between the cover 120 and the bottom 118. The insulating ring 122 has an inside diameter which is less than that of the side wall of the bottom 118 and bears in an electrically insulated manner a bottom membrane 138 and a contact membrane 134. The two membranes 134 and 138 are made of electrically conductive material, the top of the contact membrane 134 is electrically insulated relative to the adjacent cover 120 by means of an insulating layer 148 and is placed at the electrical potential of the bottom 118 via a metal coating 132, a through-plated hole 130 and solder layer 128. The battery 10 is hermetically sealed by the surrounding bottom 118, the bottom of the insulating ring 122 and the membrane 138, and its positive terminal contact via the face 72 makes contact with the inner base surface of the bottom 118.

A spring 124 is located between a shoulder of the battery housing 12 and the transition area between the insulating ring 122 and the side wall of the bottom 118. Spring 124 is used for centering and play-free contact of the face 72 of the battery housing 12 with the base surface of the bottom 118. The spring 124 is at the same time in electrical contact with the side wall of the bottom 118, the solder layer 128 and the positive terminal contact of the battery 10 which extends into the area of the shoulder adjoining the spring 124. The negative terminal contact of the battery 10 makes contact with the bottom of the membrane 138 via the face 71 of the battery housing 12 and via an optional spring 140. A metal coating 142 on the bottom of the insulating ring 122, a through-plated hole 144 through the insulating ring 122, and a solder layer 146 close the electrical connection between the membrane 138 and the cover 120 from which the negative potential is tapped via a terminal 152. A terminal 150 on the outer side wall of the bottom 118 is used to tap the positive potential of the battery 10.

Therefore, while the membrane 138 is connected to the negative terminal contact of the battery 10, the contact membrane 134 is located at a distance from the membrane 138 which corresponds to the thickness of the insulating ring 122 and makes contact with the positive terminal contact of the battery 10. This distance is such that, in an impermissible operating state of the battery 10, a curvature is impressed on the membrane 138 which is sufficient to cause it to make electrically conductive contact with the contact membrane 134 so that the battery 10 is electrically short circuited. Furthermore, a section of the solder connection 146 can be dimensioned as a fusible link which burns through irreversibly if a recharging or a discharging current exceeds a predetermined threshold. Further power supply and power output via the terminals 150, 152 is thus suppressed.

Figure 6:
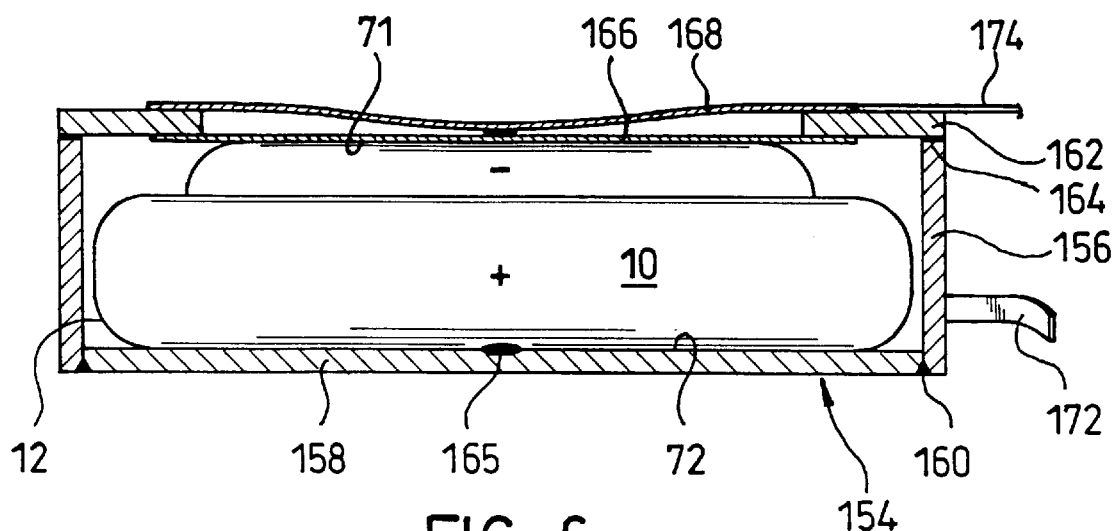
FIG. 6 is a schematic through a third embodiment of a protective device with a switching element in the closed state.
Figure 7:
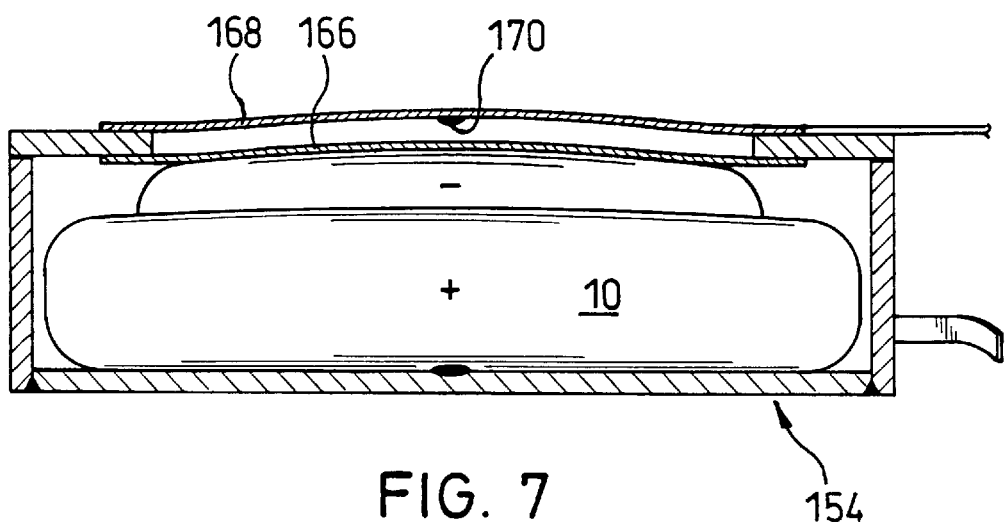
FIG. 7 is a schematic through the embodiment shown in FIG. 6 with the switching element in the opened state.

According to FIGS. 6 and 7, a third embodiment of a protective device has a protective housing 154 with an electrically conductive bottom which has a side wall 156 in the form of a pipe section which is sealed at one end by a base plate 158. A peripherally closed weld 160 connects the bottom plate 158 to the side wall 156. On the second end of the side wall 156, a ceramic insulating ring 162 is fixed via a solder layer 164 and has a round opening with an inside diameter which is less than the inside diameter of the side wall 156. A membrane 166 of electrically conductive material spans the opening of ring 162, being attached on the bottom of the insulating ring 162 facing in the direction toward the bottom plate 158, and hermetically seals the interior of the housing 154. In this interior, the battery 10 is held such that its positive terminal contact is in electrical contact with the bottom plate 158 by means of face 72. A weld spot 165 located in the center of the face 72 ensures contact with the lowest contact resistance and a defined location of the battery 10 with reference to the bottom plate 158. Instead of the welding spot 165, there can be a solder connection or an electrically conductive cement connection. The negative potential of the battery 10 is routed via its face 71 from underneath to the membrane 166, for which a conductive cement can be provided to minimize the contact resistance. Advantageously, the battery 10, with its faces 71, 72, is slightly prestressed between the membrane 166 and the bottom plate 158. An electrically conductive contact membrane 168 with a central contact point 170 pointing down is connected on the top of the insulating ring 162 and spans its opening. The contact membrane 168 is elastically pre-curved toward the inside in the direction toward the membrane 166 and is in electrical contact with the membrane 166 by means of the contact point 170 (FIG. 6). In this position of the contact membrane 168, power supply and output to or from the battery 10 can proceed via a terminal 174 that is electrically connected to the contact membrane 168 and a terminal 172 in contact with the outside of the side wall 156. If an impermissible operating state of the battery 10 occurs, the membrane 166 and with it the contact membrane 168 are curved so far to the outside that the contact membrane 168 jumps to the outside via an unstable equilibrium position, breaking the electrical contact between the two membranes 166, 168. This electrical contact remains interrupted even if the membrane 166 should return again to its original position as shown in FIG. 7.

Figure 8:
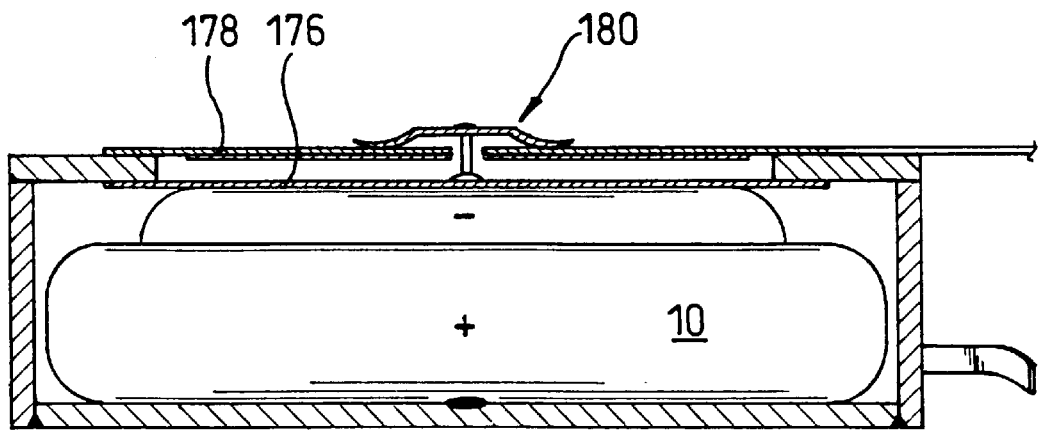
FIG. 8 is a schematic section through another embodiment of a protective device with a switching element in the closed state.
Figure 9:
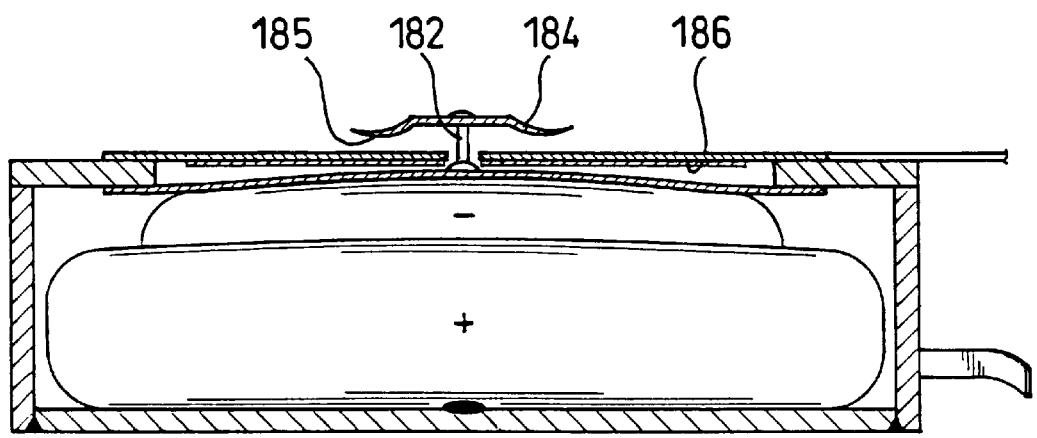
FIG. 9 is a schematic section through the embodiment shown in FIG. 8 with the switching element in the opened state.

A fourth embodiment of the protective device shown in FIGS. 8 and 9 has a protective housing which differs from the protective housing 154 essentially only by the configuration of the membranes 166, 168 and their electrical contact-making. A membrane 176, which corresponds to the membrane 166, carries a contact spring designated 180 as a whole, and which is formed of a pin 182 and a spring plate 184. One end of the cylindrical pin 182 is fixed on the top face of the membrane 176 so that its longitudinal axis stands roughly vertically. The other end of the pin 182 is connected to the spring plate 184. Here, the pin 182 penetrates an opening in a contact membrane 178 which corresponds to the contact membrane 168 of the protective housing 154. A contact surface 185 that is located in the vicinity of the outside edge of the spring plate 184, in the base position shown in FIG. 8, is in electrically conductive contact with the upper surface of the contact membrane 178. In the base position, the membranes 176, 178 run roughly parallel, and the contact surface 185 rests elastically prestressed on the contact membrane 178. In an impermissible operating state of the battery 10, the membrane 176 is forced to curve to the outside in the direction toward the contact membrane 178, which essentially does not deform and keeps its position. The curvature of the membrane 176 is enough to lift the contact surface 185 off of the contact membrane 178 and to reversibly interrupt the electrical contact, but is not so great that the top of the membrane 176 comes into contact with the bottom of the contact membrane 178 (FIG. 9). To ensure the latter, even with greater curvature of the membrane 176, the bottom of the contact membrane 178 is provided with an insulating layer 186.

Figure 10:
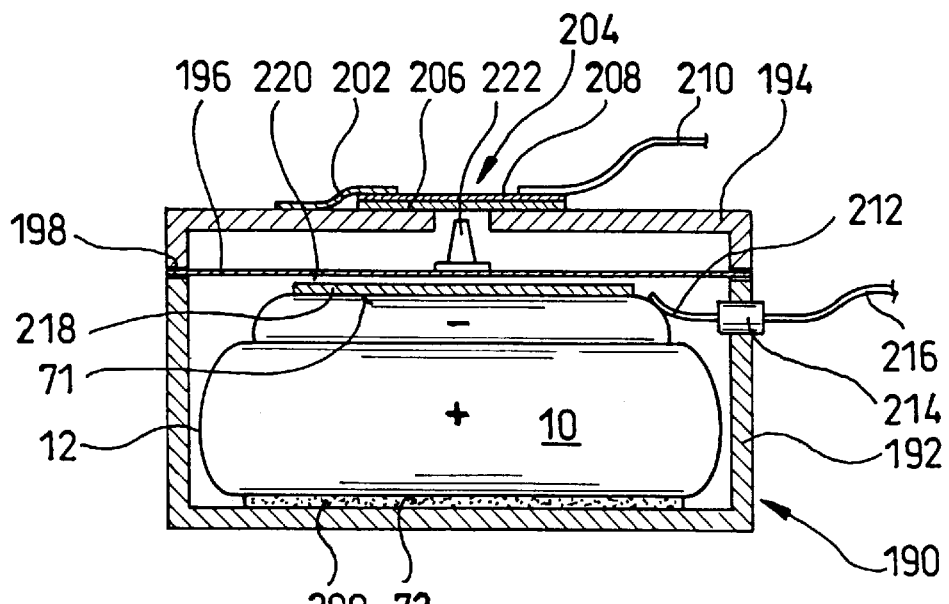
FIG. 10 is a schematic section of yet another embodiment of a protective device with an irreversibly operating switching element 6.

A fifth embodiment of a protective device as shown in FIG. 10 and comprises a protective housing 190 with a one-piece, bowl-shaped bottom 192, a likewise bowl-shaped cover 194 and a membrane 196 which, by means of a weld 198 is secured over the open end the bottom 192 and of the cover 194 connected to the bottom and cover. The bottom 192, the cover 194 and the membrane 196 preferably are made of the same electrically conductive material. The membrane 196 divides the protective housing 190 horizontally into an upper cover area and a lower hermetically sealed space which holds the battery 10.

The positive terminal contact of the battery 10 is tapped via a conductive cement 200 having a low contact resistance via the face 72 and makes contact with the inside of the bottom 192. An insulator 218 is applied to the face 71 of the battery 10 and prevents the negative terminal contact or the pole of the battery 10 from coming into contact with the membrane 196. The negative potential of the battery is tapped on a side wall of the battery housing 12 adjacent to the face 71 from the negative terminal contact via a contact spring 212 and is connected to the terminal 216 by a hermetically sealed feed-through 214 through the side wall which is electrically insulated relative to the side wall of the bottom 192. On the top of the membrane 196 in the center, a plunger 222 is attached which projects into the opening in the cover 194. At a short distance above the upper edge of the plunger 222 is a bursting element which bridges the opening and which is labeled 204 as whole. The bursting element 204 comprises, a substrate 206 on its side facing the top of the cover 194, and a conductive layer 208 on top of this substrate 206. The substrate 206 can be a ceramic, for example, an oxide ceramic, glass or the like. On one side of the opening in the cover, the conductive layer 208 makes contact with the cover 194 via a contact clip 202, and on the opposite side of the opening, a terminal 210 is attached to the conductive layer 208, with which the positive potential of the battery 10 is tapped. A gap 220 between the insulator 218 on the face 71 of the battery 10 and the membrane 196 prevents curvature of the membrane 196 when the battery 10 expands slightly, for example, as a result of a temperature increase. In an impermissible operating state of the battery 10, however, whether by an increase in the volume of the battery 10 and/or escape of chemicals from the interior of the battery 10, with the consequence of a pressure rise in a hermetically sealed battery receiving space of the protective housing 190, a curvature is impressed on the membrane 196 which is enough for the plunger 222 to destroy the bursting element 204 so that the conductive layer 208 is irreversibly interrupted between the contact clip 202 and the terminal 210.

Figure 11:
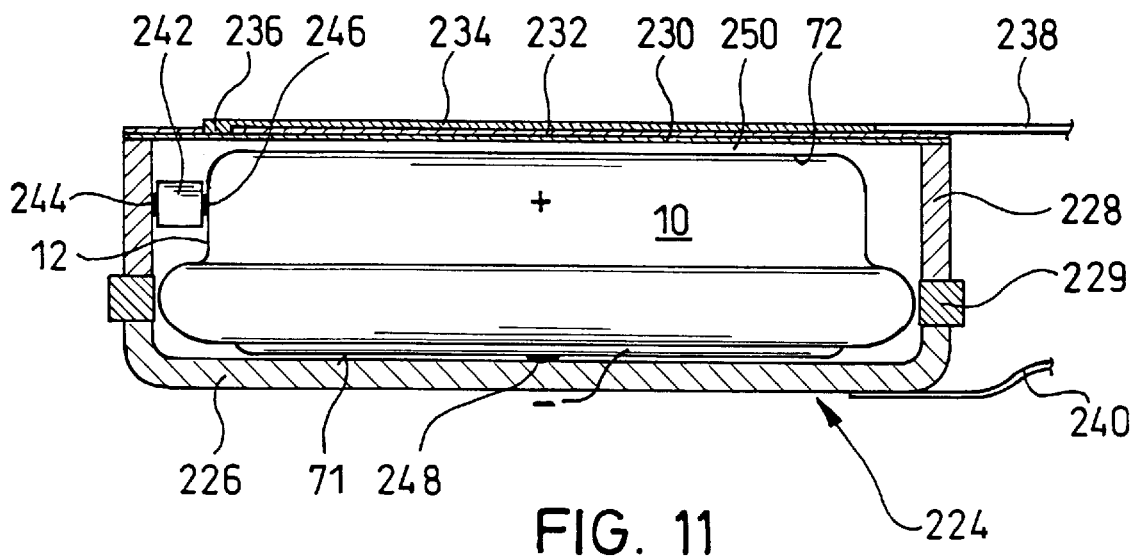
FIG. 11 is a schematic section of another modified embodiment of a protective device.

As is shown in FIG. 11, a sixth embodiment of the protective device has a protective housing 224 with a flat, electrically conductive shell-shaped bottom 226. The bottom 226 is connected at its upper end with a ceramic insulating ring 229 and which, in turn, is connected at its upper side to a side wall part 228 which has the form of a pipe section. The side wall part 228 is hermetically sealedly on its upper end by an electrically conductive membrane 230. On the outer side of membrane 230, an insulating layer 232 is provided and on this insulating layer 232, an electrically conductive, brittle bursting layer 234 is applied. The bursting layer 234 is electrically conductively connected to the membrane 230 at a first point in the area of the side wall 228 via a making contact 236, and on a second diametrically opposite site it is connected to the terminal 238, the bursting layer 234 extending between these two points in a strip-shaped manner.

The terminal 238 is used to tap the positive potential of the battery 10 which is held by the protective housing 224. In this case, the positive terminal contact of the battery 10 is tapped from the side wall of the battery housing 12 by means of a contact clip 242 which forms the electrical contact with the inside of the side wall part 228 via spot welds 244 and 246. The negative terminal contact of the battery 10 is connected, via a spot weld 248 applied centrally on the face 71, with the inside of the bottom 226 and is accessible from outside the protective housing 224 by means of a terminal 240. It goes without saying that, as an alternative to the spot welds 244, 246, and 248, for example, there can be solder connections or electrically conductive cement connections. Between the face 72 and the membrane 230 is a gap 250 to prevent the bursting layer 234 from being affected when the battery respires naturally. Only in an impermissible operating state of the battery 10 is the membrane 230 forced to curve and irreversibly destroy the bursting layer 234, thus interrupting the electrical connection between the positive terminal contact of the battery 10 and the terminal 238.

Figure 12:
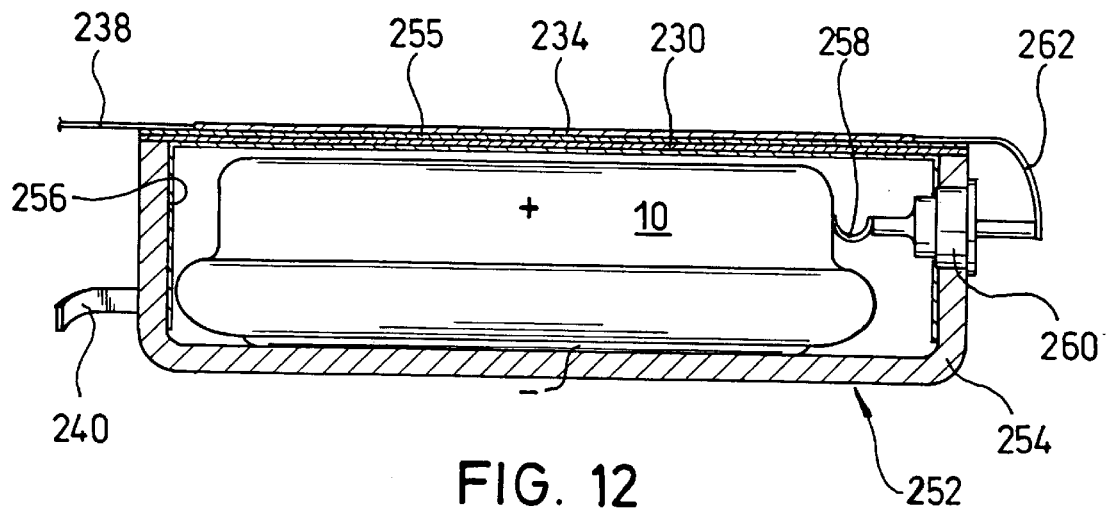
FIG. 12 is a schematic in a section of a protective device with hermetically sealed routing of a terminal contact of a battery through a protective housing.

FIG. 12 shows a seventh embodiment of a protective device; the embodiment comprises a protective housing 252 which differs from the protective housing 224 essentially only by the configuration of the bottom 226 and the tap of the positive terminal contact of the battery 10 in that embodiment. In particular, the protective housing 252 of this embodiment has a bottom 254 with side walls which extend as far as the membrane 230, to which it is hermetically sealed by being welded thereto, so that the insulating ring 229 of the protective housing 224 is eliminated. The positive terminal contact of the battery 10 is tapped via a contact clip 258 which extends from one side wall of the battery housing 12 to the outside through the housing side wall by means of a hermetically sealed feed-through 260 which is electrically insulated relative to the side wall of the bottom 254. A contact clip 262 completes the electrical connection with the electrically conductive bursting layer 234, which is insulated completely relative to the membrane 230 and the bottom 254 by an insulating layer 255.

An insulating layer 256 lines the interior of the protective housing 252 in the area of the membrane 230 and the side walls of the bottom 254 and prevents electrical contact between the positive terminal contact of the battery 10 and the membrane 230 or the side walls of bottom 254.

Figure 13:
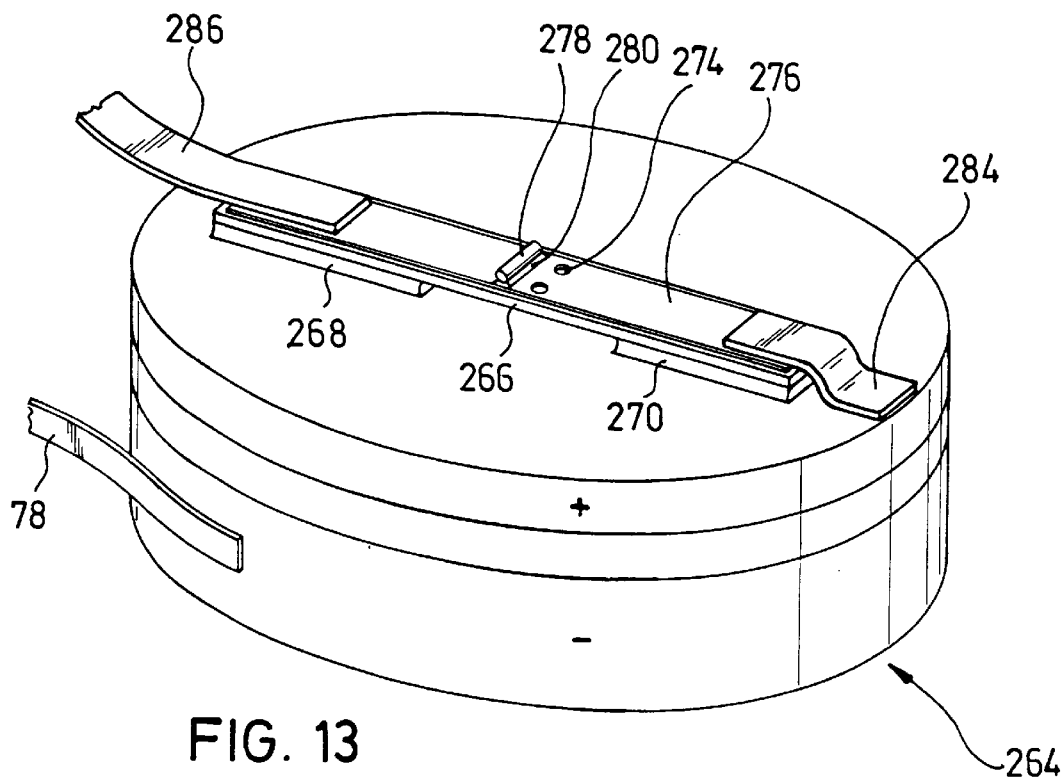
FIG. 13 is a schematic perspective view of an embodiment of a protective device with a short circuit switch and a bursting strip as an irreversible break contact.
Figure 14:
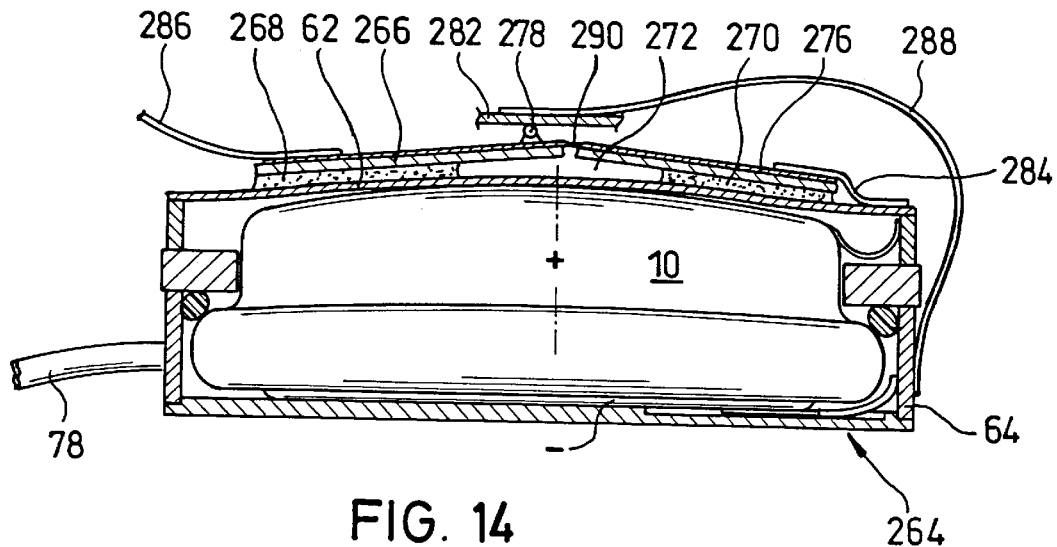
FIG. 14 is a schematic cross section of the embodiment shown in FIG. 13.

According to FIGS. 13 and 14, an eighth embodiment of a protective device is shown in which a modified protective housing 264 corresponds, for the most part, to the protective housing 54 of FIGS. 2 through 4, but does not use its switching element 86 and in which the tapping of the positive terminal contact of the battery 10 takes place in altered form. A rectangular bursting strip 266 is coupled on the outside of the cover plate 62 of the protective housing 264 via cement connections 268 and 270, each of which is roughly in the outer third of its length so that, between the cement connections 268 and 270, a bridging zone 272 is formed. A line of symmetry in the direction of the length of the bursting strip 266 runs essentially parallel to a center line of the round cover plate 62, and the center of the bridging zone 272 is located above the center point of the cover plate 62. On the top of the bursting strip 266, a conductive layer 276 is applied which extends over almost the entire top of the bursting strip 266 and which makes contact with the cover plate 62 in the area of one end of the bursting strip 266 by means of a contact clip 284, and makes contact with a terminal 286 in the area of its opposite end. Thus, an electrical connection is established between the terminal 286 and the positive terminal contact of the battery 10. In the area of the bridging zone 272 which is free of the cement layer, near a bisector of the longer side of the bursting strip 266, there is a scoring in the form of a perforation 274. The scoring can be produced of course in some other suitable way, for example, by notching, scratching or thinning of the bursting strip 266. Adjacent to the perforation 274, a wire section 278 is fixed by means of a solder connection 280 to serve as a short circuit contact and above which there is an opposite contact 282. The opposite contact 282 is in electrical contact with the side wall 64 via a contact clip 288, i.e., with the negative terminal contact of the battery 10. In an impermissible operating state of the battery 10, a curvature is impressed on the cover plate 62, which acts as a deflectable membrane, and this curvature is transmitted via the cement connections 268, 270 to the bursting strip 266, which breaks, as shown in FIG. 14, along the perforation 274. The short circuit contact 278 is pressed against the opposite contact 282 and the short circuit current between the positive and the negative terminal contact of the battery 10 is enough to burn through any fragment of the conductive layer 290 which may remain at least partially spanning the rupture site. In this way, the tapping of the positive potential of the battery 10 via the terminal 286 is irreversibly interrupted.

Since it is necessary to predict the curvature necessary to break the bursting strip 266 in the range of a few hundred microns, preferably in the range of less than 200 microns, the predefined geometry of the bursting strip 266 must be maintained very accurately. Material for the bursting strip 266 can be, for example, glass or ceramic, in which it can be advantageous to impress a mechanical prestress which increases the distance of the fracture edge after bursting of the scoring. To do this the bursting strip 266 can be made as a composite element of at least one glass or ceramic material and at least one metal, which are cemented or soldered to one another. Prestress of the bursting strip 266 can likewise be induced by using a metal with shape memory (memory effect).

It is furthermore possible to produce the bursting strip 266 from a piezoelectric material or at least provide it with one such layer. Deformations of the bursting strip 266 which do not lead to its fracture, therefore, do not indicate an impermissible operating state of the battery 10, electrical information delivered from the piezoelectric converter in the form of charge changes can be tapped from optional evaluation electronics 52 in order to actuate, for example, a switching element which corresponds to the break contact 48 or 50 of FIG. 1 and to interrupt recharging or discharging of the battery 10 before the battery reaches an impermissible operating state.

In the embodiment shown in FIGS. 13 and 14, it is possible to interchange the location of the perforation 274 and of the short circuit contact 278 with reference to the side bisectors of the longer side of the bursting strip 266 with one another so that the short circuit contact 278 comes to rest on the side of the fracture edge which is the right one in FIG. 14. In this case a short circuit current cannot burn through a fragment of conductive layer 290 which may remain, but can intentionally completely discharge the battery 10, then the contact clip 68 could not be designed as a fusible link, as is fundamentally possible (compare the corresponding details on the protective housing 54 of FIGS. 2 through 4). If multi-redundant protection is not necessary, it is furthermore possible to completely eliminate the short circuit contact 278 and the opposite contact 282, to use only the irreversible break contact function of the bursting strip 266 and to design it such that, in any case, it is ensured that a fragment of conductive layer 290 does not remain when the bursting strip 266 ruptures.

Figure 15:
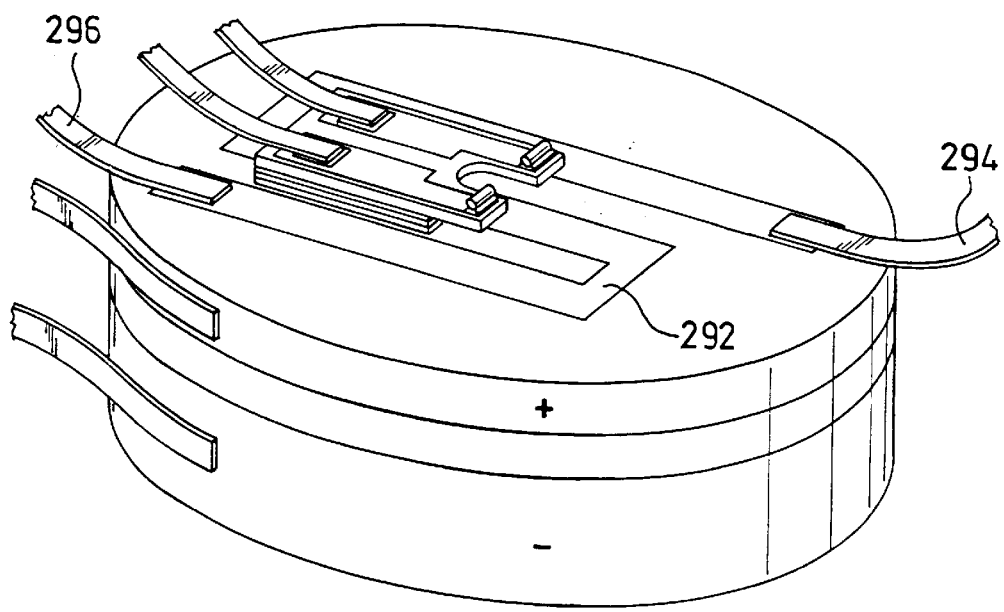
FIG. 15 is a schematic perspective of another embodiment of a protective device.

A ninth embodiment of a protective device is shown in FIG. 15 and differs from the embodiment of FIGS. 2 to 4 essentially only in that, to increase the redundancy, a strain gauge 292 is applied to the top of the cover plate 62 in a back-and-forth configuration. When the cover plate 62 deforms, the strain gauge 292 undergoes a change in shape which leads to a change of its electrical resistance which is acquired via terminals 294 and 296 from the evaluation electronics 52 and is used, for example, to actuate other switching elements, for example, for an electrically actuated make contact which can be placed away from the protective housing and in function corresponds to the make contact 46 or the break contact 50 of FIG. 1. Furthermore, the evaluation electronics 52 can activate a warning means which is not shown and which notifies the user of a malfunction of the battery 10.

Figure 16:
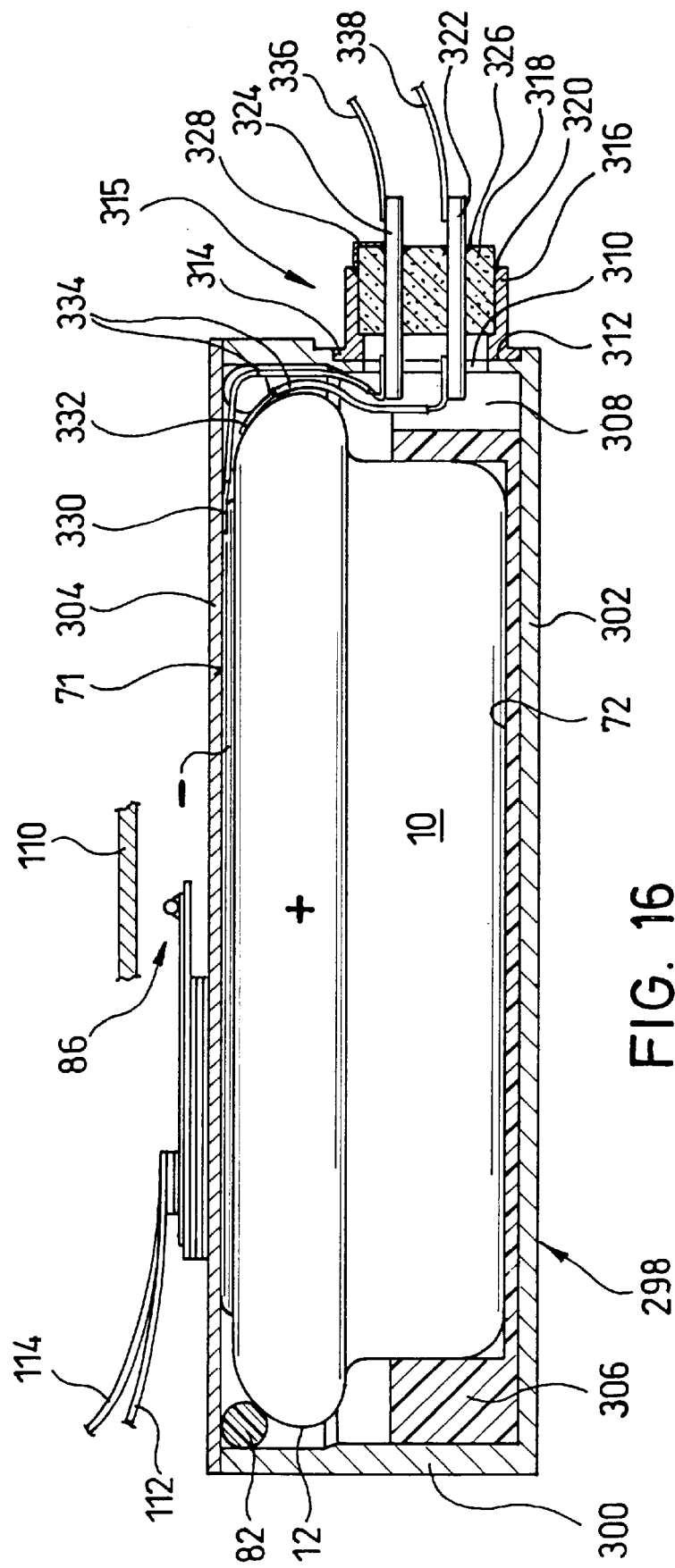
FIG. 16 is a schematic section through a protective device with a hermetically sealed feed-through of the two terminal contacts of the battery.

The protective housing 298 shown in FIG. 16 comprises the switching element 86 which has already been described in conjunction with the protective housing 54 of FIGS. 2 through 4 and differs from the protective housing 54 essentially only by the following configuration features: A metallic, preferably titanium, bottom is made bowl-shaped, a hollow cylindrical side wall 300 is closed on its lower face in one piece by means of a bottom plate 302. A cover plate 304, made as a deflectable membrane, is welded on top of the side wall 300 to create a hermetic seal. Cover plate 304 is also preferably made of titanium. A bowl-shaped receiver 306 is held within the protective housing 298 sitting on its bottom plate 302. The receiver 306 has a cylindrical side wall with an outer diameter that corresponds to the inner diameter of the side wall 300. The inner diameter of the receiver 306 is matched to the battery housing 12, the battery 10 with its face 72 abutting the inside of the bottom plate of the receiver 306 and being centered in the radial direction within the protective housing. The receiver 306 is made of an electrically insulating plastic material, for example, polytetrafluoroethylene (PTFE), and insulates the positive terminal contact of the battery 10 from the metallic protective housing. The receiver 306 is provided with a recess 308 on the outside of its side wall and is inserted in the protective housing 298 such that the recess 308 faces a radial opening 310 in the side wall 300.

The O-ring 82 is placed in the corner area between the side wall 300 and the cover plate 304 and is supported against one shoulder of the battery housing 12 which it prestresses in the direction toward the bottom plate 302 to prevent unwanted gaps from forming between the face 72, the bottom plate of the receiver 306 and the bottom plate 302. So that two volumes separated from one another do not build up within the protective housing 298, the O-ring 82 is not closed in the peripheral direction, but has a radial gap.

The cylindrical opening 310 in the side wall 300 is surrounded on the outside of the side wall 300 by a cylindrical flat surface 312 into which a shoulder 314 of a sleeve-shaped, metallic, preferably titanium, receiver 316 is fitted pointing toward the outside and is welded to form a hermetic seal. The receiver 316 is part of a feed-through labelled 315 as a whole, and which also comprises a ceramic substrate 318, for example, of $Al_2O_3$, and metallic contact pins 322, 324 which are preferably made of a platinum-iridium compound. The outer diameter of the cylindrical substrate 318 is matched to the inner diameter of the receiver 316 and is inserted into receiver 216 until it reaches a collar on the inner wall of the receiver 316. On the opposite side, the substrate 318 projects beyond the receiver 316 and is connected to it in a hermetically sealed manner via a gold solder connection 320. The contact pins 322 and 324 shown in FIG. 16 penetrate the substrate 318 in the axial direction and are hermetically sealed in it also by means of a gold solder connection 326. Pins 322, 324 have a length which is enough to project axially from the feed-through 315 on both ends, and they project into the recess 308 on the side facing the interior of the protective housing 298. The pin 322 makes contact via a contact clip 332 with the positive terminal contact of the battery 10 in the area of the shoulder of the battery housing 12 on which the O-ring 82 is supported. The O-ring 82 is oriented such that the contact clip 332, just like the contact clip 330 which forms a current path between the negative terminal contact of the battery 10 and the contact pin 324, is guided through the radial gap of the O-ring 82. The two contact clips 330, 332 are surrounded by an insulating tube 334. Between the face 71 of the battery 10 and the bottom of the cover plate 304, in the already described manner, there is a gap which equalizes the natural respiration of the battery housing 12. The negative terminal contact of the battery 10, depending on the operating state, touches the cover plate 304 from underneath, by which the metallic components 300, 302, 304, and 316 of the protective housing 298 are placed at the negative potential of the battery 10. To keep these components defined at negative potential independently of the operating state of the battery 10, i.e., independently of the expansion of their volume, there is a solder bridge 328 on the feed-through 315 which extends between the contact pin 324 and the receiver 316. Outside the protective housing 298, the positive and negative terminal contact of the battery 10 are tapped via terminals 338 and 336.

The protective housing 298 can be produced with lower cost as compared to the protective housing 54 since the bottom of the protective housing 298 is made in one piece and a ceramic insulation ring 80 is not used. The especially critical metal-ceramic transition is minimized and limited to a part 315 which is to be produced and checked separately. This part contributes greatly to higher compressive strength of the protective housing 298.

Figure 17:
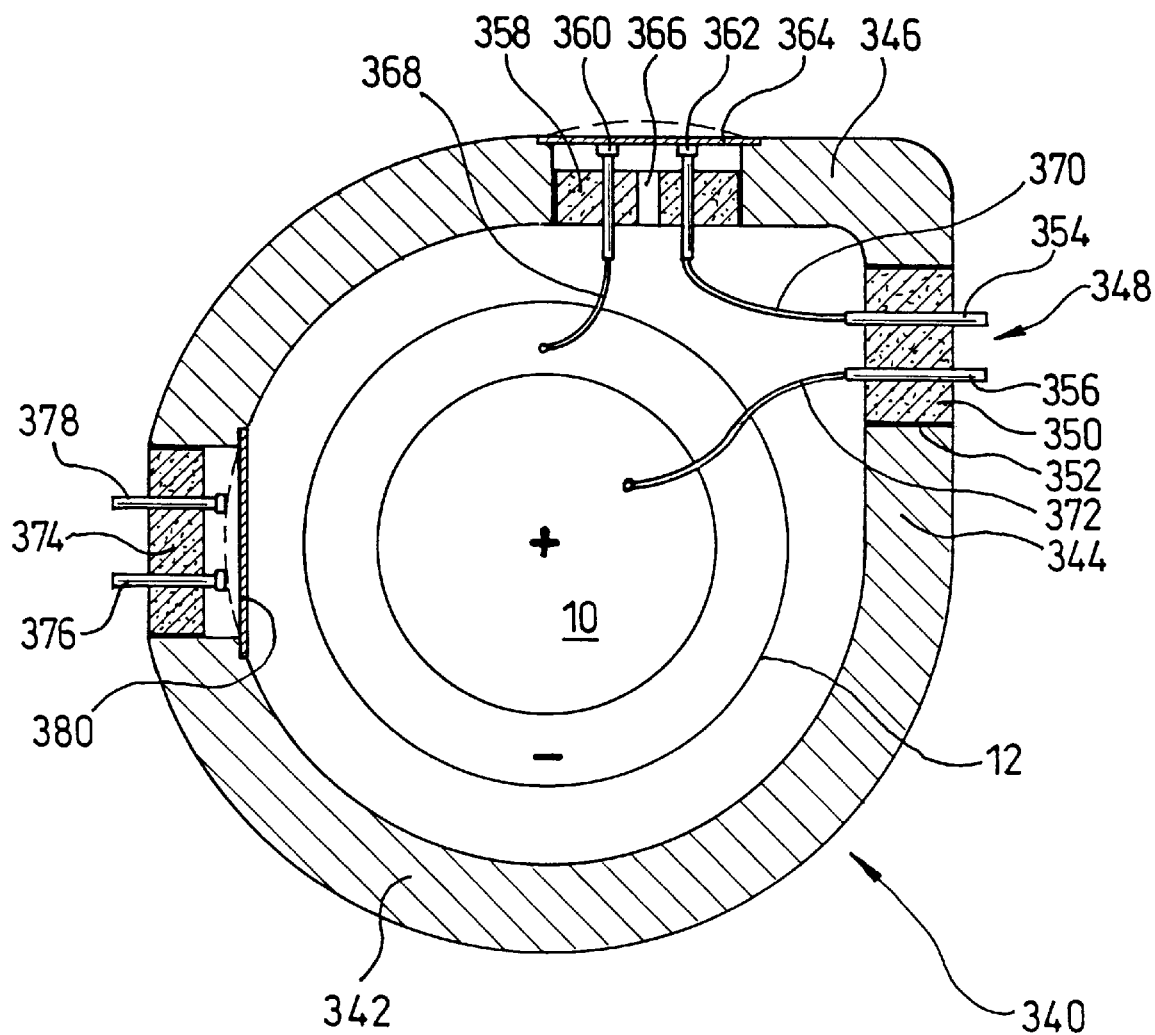
FIG. 17 is a schematic section through a protective device with a twin-pole feed-through, the feed-through and the switching and detector elements being integrated in a side wall of the protective housing.

As follows from FIG. 17, a protective housing 340, viewed in the direction of the smallest dimension of the battery 10, i.e., axially, instead of a cylindrical cross-sectional shape, can have a different, for example, a roughly droplet-shaped cross-sectional shape. In the embodiment of the protective housing 340 as shown in FIG. 17, the side wall is formed by a segment 342 in the form of a three-quarter circle and two linear segments 344 and 346 which adjoin one another tangentially to both sides of the three-quarters circle, the segments being closed via a rounded corner area between them. The side wall is metallic, preferably made of titanium, and together with the one-piece bottom plate, forms a cup-shaped bottom for holding the battery 10. A cover plate (not shown) and which is likewise made of titanium is hermetically sealed to the upper end of the side wall by welding. For the sake of clarity, the wall thickness of the segments 342, 344 and 346 is shown enlarged. The battery 10 is fixed within the protective housing 340 by centering means (not shown), at least the positive terminal contact of the battery 10 being electrically insulated with respect to the bowl-shaped bottom and the cover plate.

A feed-through labelled 348 as whole differs from feed-through 315 of FIG. 16 essentially by the elimination of the receiver 316 so that a ceramic substrate 350 is hermetically sealed by being soldered, not into the receiver, but directly to the side wall of the protective housing 340, for which gold solder is preferably used. The ceramic substrate 350 is soldered at 352 to the linear segment 344, but it is likewise possible to accommodate the substrate 350 in the circular segment 342. Metallic contact pins 354 and 356 are used for separate connection to the negative and the positive terminal contact of the battery 10 and are soldered in the ceramic substrate 350 in a hermetically sealed manner. With regard to the preferred material selection for the contact pins 354, 356 and the substrate 350, reference is made to the statements on the feed-through 315. Also for feed-through 348, there can be an electrical connection similar to a solder bridge 328 (see FIG. 16) between the contact pin 354 and the segment 344 in order to place the housing at a negative potential in a defined manner. By means of a solder connection, a cylindrical opening in the segment 346 holds a ceramic substrate 358 which is penetrated by two contact pins 360 and 362 which are held in the substrate via a solder connection and which project beyond the latter axially on both ends. The opening in the segment 346 is hermetically sealed on the outside by a metallic membrane 364, the side of membrane 364 directed toward the interior of the protective housing 340, in the base state, i.e. at a not unduly increased pressure within the protective housing 340, adjoins the contact pins 360 and 362 with a defined prestress and connects them electrically. An opening 366 in the substrate 358 ensures that, in the axial direction to both sides of the substrate, i.e. on the side of the substrate 358 facing the battery 10, just as on the side facing the inside of the membrane 364, essentially the same pressure prevails.

While the contact clip 372 connects the positive terminal contact of the battery 10 directly to the contact pin 356 of the feed-through 348, the second contact pin 354 of the feed-through 348, with the interposition of a break contact, makes contact with the negative terminal contact of the battery 10, the make contact comprising a contact pair formed from the contact pins 360, 362 and the membrane 364. Here, a contact clip 368 is provided between the negative terminal contact of the battery 10 and the contact pin 360 as well as the contact clip 370 between the contact pin 362 and the contact pin 354.

Membrane 364 cannot detect an expansion of the volume of the battery 10; however, in the case of an escape of chemicals from the interior of the battery housing 12, which leads to a predetermined pressure threshold being exceeded within the hermetically sealed protective housing 340, a curvature (represented by a dash line) is impressed on the membrane 364 which is in fluid communication with the remaining interior of the protective housing 340 via the opening 366; this curvature is enough to raise the membrane 364 off the contact pins 360 and 362. The electrical connection between the two contact pins 360, 362, and thus between the negative terminal contact of the battery 10 and the contact pin 354 of the feed-through 348, is then reversibly interrupted.

The protective housing 340 has another switching element which is integrated in the circular segment 342 and is made as a reversible make contact. This switching element can be present in addition to or instead of the aforementioned break contact. A membrane 380 is at the same time a detector element and part of the make contact. It is provided on the inside of the segment 342 facing the battery 10 and closes an opening in the segment 342. In the cylindrical opening, a ceramic substrate 374 is soldered such that two contact pins 376 and 378 which axially penetrate the substrate 374 in the base position of the membrane 380 are at a predetermined distance to its outside. The membrane 380 is made electrically conductive at least in the area of its outer side which is adjacent to the contact pins 376, 378. But preferably, the entire membrane 380 is electrically conductive, especially made of a material which is compatible with the material of the metallic bottom and the cover plate of the protective housing 340 and is welded in the segment 342. In this case, on the whole, it is at the electrical potential of the indicated metallic housing parts.

The membrane 380 need not necessarily hermetically seal the opening in the segment 342. It is sufficient if it is sealed enough to experience a curvature in response to an unduly high pressure rise within the protective housing 340 (in FIG. 17 indicated by a dash line) which brings at least its conductive area into electrical contact with the contact pins 376 and 378 and electrically short circuits them. The hermetic sealing must then be guaranteed by substrate 374 which would have to be hermetically sealed by being soldered to the segment 342 and to the contact pins 376, 378. Furthermore, a compression space formed between the substrate 374 and the membrane 380 would have to be considered in the design of the membrane 380. If, on the other hand, the membrane 380 closes the opening in the segment 342 in a hermetically sealed manner, which is preferred, a hermetically sealed configuration of the substrate 374 and the corresponding solder connections between the substrate 374 and the contact pins 376, 378 and the segment 342 is not absolutely necessary, but is a good idea under certain circumstances.

It goes without saying that the protective housing 340 can be designed such that expansion of the volume of the battery 10 in the direction of curvature of the membrane 380, i.e., essentially perpendicular to the smallest dimension of the battery 10, actuates the membrane 380. Preferred materials for the contact pins 360, 362, 376, 378 and the substrates 358 and 374 of the break contact or the make contact correspond to those of the corresponding components of the feed-through 348.

The break contact of the protective housing 340, which comprises the membrane 380 and contact pair formed by the contact pins 376, 378 can be used, for example, corresponding to make contact 44 (see, FIG. 1) to directly short circuit the recharging circuit 22. It is likewise possible to monitor the break contact by means of the evaluation electronics 52 which, for its part, actuates other switching elements or the aforementioned warning means.

One important advantage of the protective housing 340 can be seen in that by integration of all detector and switching elements and the feed-through in the side wall of the protective housing 340, it can be very flat and is essentially thicker than battery 10 only by the wall thicknesses of the bottom and the cover plate in the direction of the smallest dimension of the battery 10.

If the protective housing of the invention, as a whole, is made biocompatible, it can be implanted directly and connected to the user via permanently connected or detachable electric lines; its implantation site is thus irrelevant, as noted above in the "Summary" portion of this application. Materials for the bio-compatible protective housing can be, preferably, titanium, niobium, tantalum, implantable steels or a composite thereof or of other implantable metals with ceramic materials, such as aluminum oxide ceramic, for which jacketing of the entire protective housing with a bio-compatible polymer can be a good idea, such as, for example, silicone, polytetrafluoroethylene (PTFE), polymethane, parylene or the like.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Protective device for a repeatedly rechargeable electrochemical battery with a battery housing, comprising a hermetically sealed protective housing, a detector element, and at least one switching element which is activatable by the detector element and which prevents at least one of recharging and discharging of the battery when the battery is in predetermined operating state; wherein the hermetically sealed protective housing has a receiving space for the battery housing and is part of an implantable medical device; wherein the detector element is constructed and arranged to deflect, at least in part, in response to occurrence of said predetermined operating state of the battery, wherein the switching element is positioned so as to be activated by deflection of at least part of said detector element; and wherein said detector element forms part of the protective housing.

2. Protective device as claimed in claim 1, wherein said at least one switching element is a break contact which electrically interrupts a recharging circuit powered by a charging device when said at least one switching element is activated by said deflection of at least part of the detector element in response to said occurrence of said predetermined operating state of the battery.

3. Protective device as claimed in claim 1, wherein said at least one switching element is a break contact which electrically interrupts a consumer circuit which is electrically connected to the battery when said at least one switching element is activated by said deflection of at least part of the detector element in response to said occurrence of said predetermined operating state of the battery.

4. Protective device as claimed in claim 1, wherein said at least one switching element is a make contact which electrically short circuits a recharging circuit powered by a charging device when said at least one switching element is activated by said deflection of at least part of the detector element in response to said occurrence of said predetermined operating state of the battery.

5. Protective device as claimed claim 1, wherein said at least one switching element is a make contact which electrically short circuits the battery when said at least one switching element is activated by said deflection of at least part of the detector element in response to said occurrence of said predetermined operating state of the battery.

6. Protective device as claimed in claim 1 wherein said at least one switching element irreversibly interrupts a circuit when said at least one switching element is activated by said deflection of at least part of the detector element in response to said occurrence of said predetermined operating state of the battery..

7. Protective device as claimed in claim 1, wherein said at least one switching element reversibly interrupts a circuit when said at least one switching element is activated by said deflection of at least part of the detector element in response to said occurrence of said predetermined operating state of the battery.

8. Protective device as claimed in claim 1, wherein at least one overcurrent fuse is provided for limiting a current in at least one of a recharging and consumer circuit of the battery.

9. Protective device as claimed in claim 1, wherein at least one overcurrent fuse is provided for interrupting a current in at least one of a recharging and consumer circuit of the battery.

10. Protective device as claimed in claim 1, wherein said at least one switching element is positioned close enough to the detector element to be mechanically actuated by means of the deflection of at least part of the detector element.

11. Protective device as claimed in claim 1, wherein said at least one switching element is coupled to evaluation electronics having means for determining the occurrence of said deflection of at least part of the detector element and for causing activation of said at least one switching element in response to said determination.

12. Protective device as claimed in claim 11, wherein said means for determining comprises an electrical extensometer.

13. Protective device as claimed in claim 12, wherein the electrical extensometer is a strain gauge.

14. Protective device as claimed in claim 12, wherein the electrical extensometer is a piezoelectric converter.

15. Protective device as claimed in claim 1, wherein the detector element is part of the protective housing.

16. Protective device as claimed in claim 15, wherein the detector element comprises a deflectable membrane.

17. Protective device as claimed in claim 16, wherein the membrane forms an outer wall of the protective housing.

18. Protective device as claimed in claim 16, wherein the membrane forms a partition within the protective housing.

19. Protective device as claimed in claim 15, wherein the detector comprises at least one membrane which is integrated into a side wall of the hermetically sealed protective housing; and where the at least one membrane has a direction of curvature running essentially perpendicular to a smallest dimension of the battery.

20. Protective device as claimed in claim 19, wherein said at least one membrane is part of a make contact having a contact pair, said at least one membrane being a means for electrically short circuiting the contact pair of the make contact.

21. Protective device as claimed in claim 19, wherein said at least one membrane is part of a break contact having a contact pair, said at least one membrane being a means electrically disengaging the contact pair of the break contact.

22. Protective device as claimed in claim 1, wherein the protective housing has areas which are electrically insulated relative to one another; and wherein the battery has two terminal contacts which make electrical contact with the areas of the protective housing which are electrically insulated relative to one another, the areas of the protective housing which are electrically insulated relative to one another being electrically conductive and being electrically connected to at least one of a recharging circuit and a consumer circuit.

23. Protective device as claimed in claim 1, wherein the battery housing has at least one terminal contact which is electrically connected to at least one of a recharging circuit and a consumer circuit via a hermetically sealed feed-through which is electrically insulated with reference to the protective housing.

24. Protective device as claimed in claim 23, wherein the feed-through is at least one-poled and comprises a ceramic substrate; and wherein, for each pole, a metallic contact pin is provided which penetrates the substrate in a hermetically sealed manner.

25. Protective device as claimed in claim 24, wherein hermetic sealing of each contact pin in the ceramic substrate is provided by means of a material connection; and wherein the substrate is hermetically sealed in an outside wall of the protective housing by means of a material connection.

26. Protective device as claimed in claim 24, wherein hermetic sealing of each contact pin in the ceramic substrate is provided by means of a material connection; wherein the substrate is hermetically sealed in an a metallic receiver by means of a material connection; and wherein the metallic receiver is connected to an outside wall of the protective housing by a material connection.

27. Protective device as claimed in claim 1, wherein said impermissible operating state of the battery comprises at least one of an unacceptable expansion in the volume of the battery and an escaping of gas from the battery housing which results in an unacceptable pressure rise within the hermetically sealed protective housing.

28. Protective device as claimed in claim 1, wherein the protective housing is made of a biocompatible material.

29. Protective device as claimed in claim 1, wherein said predetermined operating state is one of an predetermined expansion of the battery housing and leakage of gas from the battery housing.

30. Protective device for a repeatedly rechargeable electrochemical battery with a battery housing, comprising a hermetically sealed protective housing, a detector element, and at least one switching element which is activatable by the detector element and which prevents at least one of recharging and discharging of the battery when the battery is in a predetermined operating state; wherein the hermetically sealed protective housing has a receiving space for the battery housing and is part of an implantable medical device; wherein the detector element is constructed and arranged to deflect, at least in part, in response to occurrence of said predetermined operating state of the battery; wherein the switching element is positioned so as to be activated by deflection of the detector element; and wherein said detector element is external to the battery housing and is received in the protective housing.

31. Protective device as claimed in claim 30, wherein said predetermined operating state is one of a predetermined expansion of the battery housing and leakage of gas from the battery housing.

* * * * *

UNITED STATES PATENT AND TRADEMARK OFFICE
CERTIFICATE OF CORRECTION

PATENT NO : 6,143,440
DATED : November 7, 2000
INVENTOR(S) : Andreas VOLZ; Joachim BAUMANN; Klaus BOGDANOWITZ; Hans LEYSIEFFER; Dieter MULLER; and Gerd MULLER It is certified that an error appears in the above-identified patent and that said Letters Patent is hereby corrected as shown below:

Item [75] INVENTORS

Line 2, please change "Klaus BO<u>DG</u>ANOWITZ" to --Klaus BO<u>GD</u>ANOWITZ--

Signed and Sealed this

Twenty-ninth Day of May, 2001

*Attest:*

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,143,440 | Page 1 of 1 |
| APPLICATION NO. | : 09/359120 | |
| DATED | : November 7, 2000 | |
| INVENTOR(S) | : Andreas Volz | |

It is certified that error appears in the above-identified patent and that said Letters Patent is hereby corrected as shown below:

The Title page, Item no. (75), Please delete "Klaus BO_DG_ANOWITZ" and insert -- Klaus BO_GD_ANOWITZ--.

Signed and Sealed this

Thirtieth Day of October, 2007

JON W. DUDAS
*Director of the United States Patent and Trademark Office*